(12) United States Patent
Miyoshi et al.

(10) Patent No.: US 6,910,732 B2
(45) Date of Patent: Jun. 28, 2005

(54) SIDE BODY STRUCTURE

(75) Inventors: Shinsuke Miyoshi, Aichi (JP); Satoshi Arakawa, Aichi (JP); Takashi Yakata, Aichi (JP); Keishi Goto, Aichi (JP); Takashi Kikuchi, Aichi (JP)

(73) Assignees: Mitsubishi Jidosha Kogyo Kabushiki Kaisha, Tokyo (JP); Mitsubishi Jidosha Engineering Kabushiki Kaisha, Okazaki (JP)

( * ) Notice: Subject to any disclaimer, the term of this patent is extended or adjusted under 35 U.S.C. 154(b) by 0 days.

(21) Appl. No.: 10/926,313

(22) Filed: Aug. 26, 2004

(65) Prior Publication Data

US 2005/0046238 A1 Mar. 3, 2005

(30) Foreign Application Priority Data

Aug. 29, 2003 (JP) .............................. 2003-307457

(51) Int. Cl.$^7$ .......................... B62D 25/02; B62D 25/04
(52) U.S. Cl. ........................... 296/203.03; 296/187.12; 296/193.05

(58) Field of Search ...................... 296/187.12, 193.05, 296/193.06, 205.03, 146.6

(56) References Cited

U.S. PATENT DOCUMENTS

| 5,785,378 | A | * | 7/1998 | Seefried et al. | ........ | 296/203.03 |
| 5,938,275 | A | * | 8/1999 | Kleinhans et al. | ..... | 296/203.03 |
| 6,648,404 | B2 | * | 11/2003 | Yakata et al. | .......... | 296/203.03 |
| 6,692,065 | B2 | * | 2/2004 | Yamamoto et al. | .... | 296/203.03 |

FOREIGN PATENT DOCUMENTS

JP 9-104358 A 4/1997

\* cited by examiner

*Primary Examiner*—Jason Morrow
(74) *Attorney, Agent, or Firm*—Birch Stewart Kolasch & Birch, LLP

(57) ABSTRACT

In a side body structure, a front reinforce is provided between a side body outer panel and a side body inner panel and also, a rear roof side reinforce is provided so as to couple the front reinforce to a rear pillar reinforce along the upper edge of an opening of a rear door, and vehicle body rigidity of the periphery of the opening of the rear door as well as the periphery of an opening of a front door is enhanced.

6 Claims, 5 Drawing Sheets

SIDE BODY STRUCTURE

CROSS REFERENCES TO RELATED APPLICATION

This non-provisional application incorporates by reference the subject matter of Application No. 2003-307457 filed in Japan on Aug. 29, 2003, on which a priority claim is based under 35 U.S.C. §119(a).

BACKGROUND OF THE INVENTION

1. Field of the Invention

This invention relates to a side body structure, and particularly to a technique for enhancing vehicle body rigidity of the periphery of an opening of a front door and the periphery of an opening of a rear door of a vehicle having a front door and a rear door.

2. Description of the Related Art

Generally, a side body of a vehicle is constructed so that a side body inner panel is joined to the inside of the vehicle of a side body outer panel which is an outer plate and a closed sectional structure is formed by these side body outer panel and side body inner panel and rigidity of the vehicle is ensured.

However, in a vehicle such as a passenger vehicle having a front door and a rear door like a four door vehicle, an opening of the front door and an opening of the rear door are formed in a side body, so that there is a disadvantage that an opening area is large and vehicle body rigidity of the side body reduces.

Normally, a rear pillar needs to sufficiently support an input from rear wheels, so that a rear pillar portion is provided with a rear pillar reinforce along a rear edge upper portion of an opening of a rear door between a side body outer panel and a side body inner panel as a reinforcing material and as a result of this, vehicle body rigidity of the periphery of the opening of the rear door is ensured to some extent.

However, the vehicle body rigidity of the whole side body cannot be enhanced by only such a rear pillar reinforce and particularly, a front pillar or a center pillar is narrower than the rear pillar, so that vehicle body rigidity of the periphery of an opening of a front door tends to be low.

Thus, as disclosed in JP-A-9-104358, a side body structure in which a reinforce is interposed between a side body outer panel and a side body inner panel in the periphery of an opening of a front door has been developed.

However, even when the rear pillar reinforce is provided and vehicle body rigidity of the periphery of an opening of a front door is enhanced as shown in the side body structure disclosed in the the publication, vehicle body rigidity of the periphery of an opening of a rear door is still not provided sufficiently.

Particularly, the upper edge of an opening of a rear door is coupled to a roof panel, but the roof panel is a flat plate, so that rigidity is low originally and when vehicle body rigidity of an upper edge portion of the opening of the rear door is low, there is a problem that the upper edge portion of the opening of the rear door tends to be bent and deformed along with the roof panel, for example, at the time of collision of a vehicle. In this case, difficulties in opening and closing the rear door may be caused.

SUMMARY OF THE INVENTION

The invention is implemented to solve such problems, and an object of the invention is to provide a side body structure for enhancing vehicle body rigidity of the periphery of an opening of a rear door as well as the periphery of an opening of a front door.

For this purpose, there is provided a side body structure of a vehicle having a front door and a rear door, including: a side body outer panel which forms an outer member of the vehicle and independently defines an opening of the front door and an opening of the rear door with a center pillar part sandwiched between the openings; a side body inner panel which is provided along the side body outer panel in the inside of the vehicle of the side body outer panel and forms a closed sectional structure together with the side body outer panel; and a side body reinforce provided in a shape of the letter "8" along the peripheral edge of the opening of the front door and the peripheral edge of the opening of the rear door between the side body outer panel and the side body inner panel.

DETAILED DESCRIPTION OF PREFERRED EMBODIMENTS

Embodiments of a side body structure according to the invention will be described below with reference to the accompanying drawings.

First, a first embodiment will be described.

Figure 1:
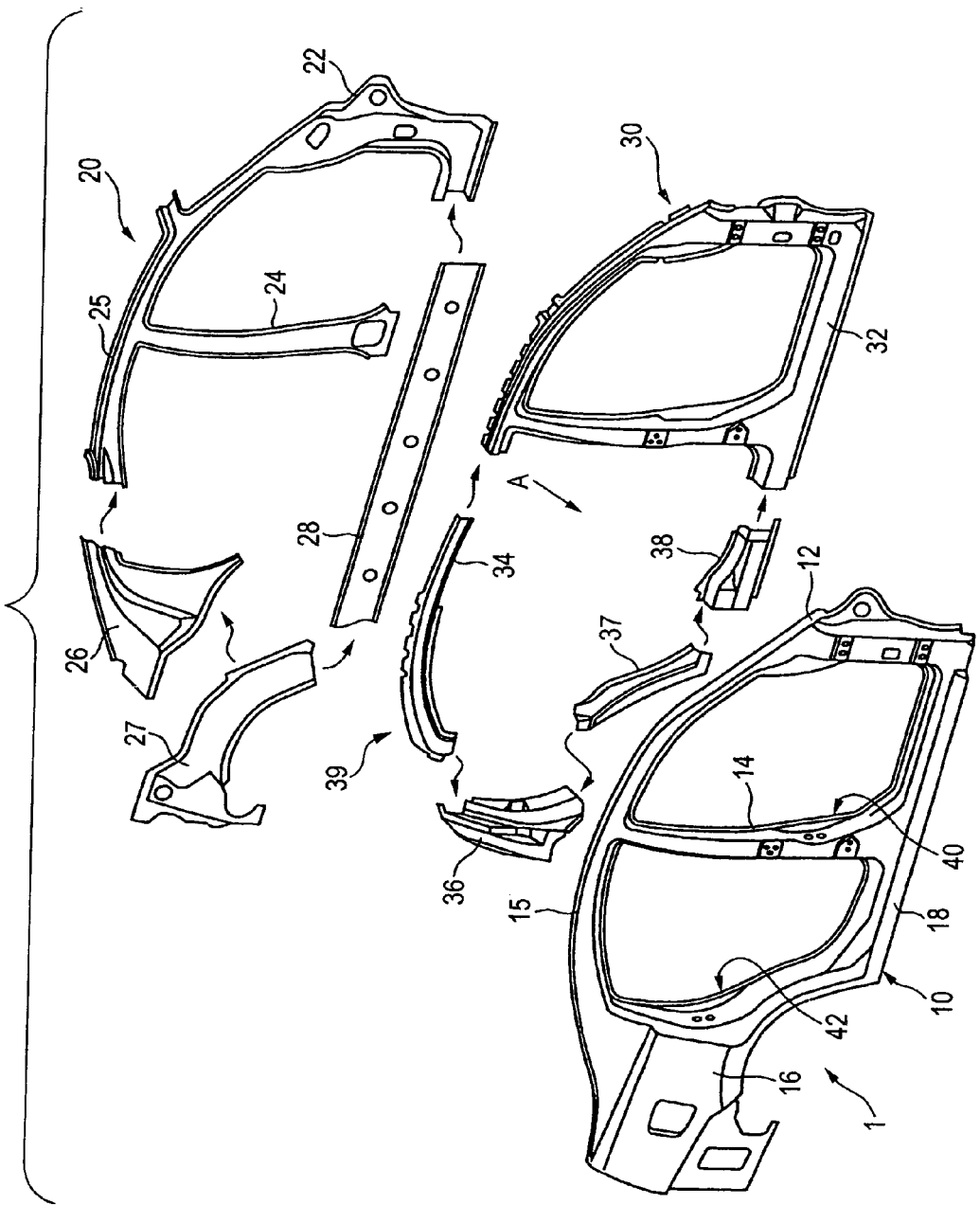
FIG. 1 is an exploded configuration view showing a side body according to a first embodiment of the invention.

Referring to FIG. 1, a right portion of a pair of right and left side bodies 1, 1 of a sedan type passenger vehicle having a front door and a rear door (both are not shown) is shown in an exploded configuration view, and a side body structure according to the first embodiment of the invention will be described below based on the same view. Incidentally, a vehicle body structure of a left portion (not shown) and a vehicle body structure of the right portion are symmetrical with respect to the center of the vehicle.

The side body 1 is configured so that a side body inner 20 is joined to the vehicle inside of a side body outer 10 which is an outer member and a closed sectional structure is formed and further a side body reinforce 30 with a plate thickness slightly thicker than that of the side body outer 10 and the side body inner 20 is interposed between the side body outer 10 and the side body inner 20.

Also, the side body outer panel 10 independently forms an opening of the front door and an opening of the rear door with a center pillar part sandwiched between the openings.

Specifically, the side body outer 10 is configured so as to have an opening 40 of the front door and an opening 42 of the rear door, and a front pillar outer part 12, a center pillar outer part 14, a roof side outer part 15, a rear fender part 16 and a sill outer part 18 are integrally molded by press. Incidentally, these front pillar outer part 12, center pillar outer part 14, roof side outer part 15, rear fender part 16 and sill outer part 18 may be separate parts and the side body outer 10 may be formed by joining these parts.

In the side body inner 20, a front pillar inner part 22, a center pillar inner part 24, a roof side inner part 25 are integrally molded in accordance with a shape of the side body outer 10 and further, a rear pillar inner upper 26, a rear pillar inner lower 27 and a sill inner 28 are formed by being joined along the shape of the side body outer 10 as shown by arrows.

That is, the side body inner 20 is formed so as to have a shape of the letter "8" along the peripheral edge of the opening 40 of the front door and the peripheral edge of the opening 42 of the rear door in accordance with the shape of the side body outer 10.

Also, the side body reinforce 30 is formed by joining a front reinforce 32 molded along the peripheral edge of the opening 40 of the front door, a rear roof side reinforce 34, a rear pillar upper reinforce (rear pillar reinforce) 36, a rear pillar lower reinforce 37 and a sill reinforce 38 along a shape of the side body outer 10 or a shape of the side body inner 20 too as shown by arrows.

The front reinforce 32 is provided along the peripheral edge of the opening of the front door between the side body outer 10 and the side body inner 20, and forms a closed sectional structure together with at least the side body inner 20.

Also, the rear pillar upper reinforce (rear pillar reinforce) 36 is provided along a rear edge upper portion of the opening of the rear door between the side body outer 10 and the side body inner 20, and forms a closed sectional structure together with at least the side body inner 20.

Further, the rear roof side reinforce is provided so as to couple the front reinforce 32 to the rear pillar upper reinforce (rear pillar reinforce) 36 along the upper edge of the opening of the rear door between the side body outer 10 and the side body inner 20, and forms a closed sectional structure together with at least the side body inner 20.

Also, the sill reinforce 38 is coupled to the front reinforce 32 and is disposed in a state opposed to a side sill part of the side body outer 10.

The rear pillar lower reinforce 37 is formed along a rear wheel house and couples the rear pillar upper reinforce (rear pillar reinforce) 36 to the sill reinforce 38.

Incidentally, the rear roof side reinforce 34, the rear pillar upper reinforce (rear pillar reinforce) 36, the rear pillar lower reinforce 37 and the sill reinforce 38 form a rear reinforce 39.

Figure 2:
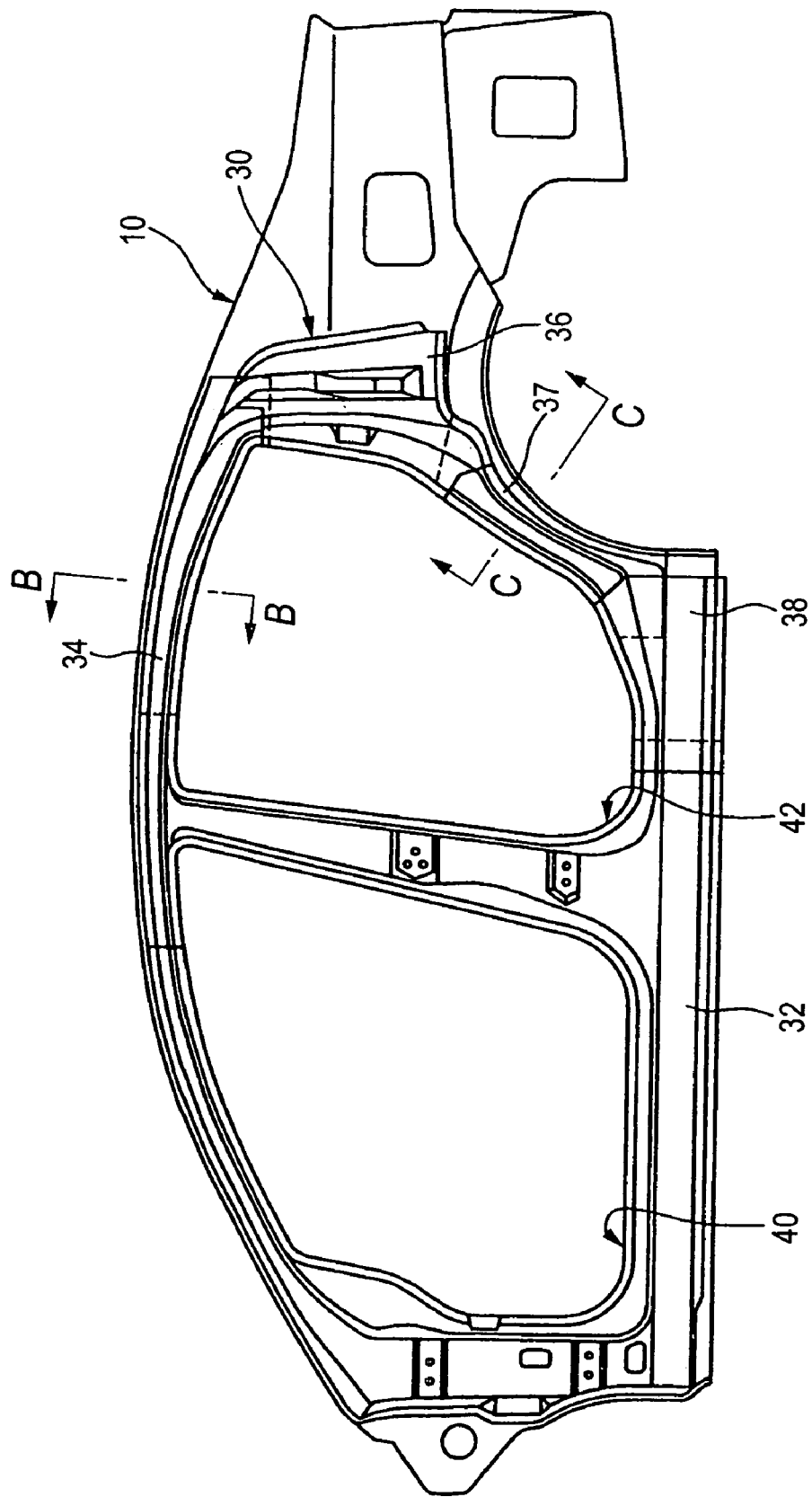
FIG. 2 is a view viewed from a direction of an arrow A of FIG. 1 and is a view of a state in which only a side body reinforce according to the first embodiment of the invention is set in a side body outer.

In other words, referring to FIG. 2, a view viewed from a direction of an arrow A of FIG. 1, that is, a view of a state in which only the side body reinforce 30 is set in the side body outer 10 without setting the side body inner 20, and the side body reinforce 30 is also formed so as to define have the letter "8" shape along the peripheral edge of the opening 40 of the front door and the peripheral edge of the opening 42 of the rear door in accordance with a shape of the side body outer 10 or a shape of the side body inner 20.

Then, the side body outer 10, the side body inner 20 and the side body reinforce 30 are joined in each of the peripheral edge flanges, or the side body outer 10 and the side body inner 20 are joined in each of the peripheral edge flanges and also the side body inner 20 and the side body reinforce 30 are joined mutually. As a result of this, a closed sectional structure divided into two portions is formed from the side body outer 10, the side body inner 20 and the side body reinforce 30, or a closed sectional structure is formed from the side body outer 10 and the side body inner 20 and also in the inside of the closed sectional structure, a closed sectional structure is further formed from the side body inner 20 and the side body reinforce 30.

That is, the closed sectional structures are formed from the front pillar outer part 12 and the front pillar inner part 22, the center pillar outer part 14 and the center pillar inner part 24, the roof side outer part 15 and the roof side inner part 25, the front of the rear fender part 16 and the rear pillar inner upper 26 and the rear pillar inner lower 27, and the sill outer part 18 and the sill inner 28, and further each of the closed sectional structures is reinforced by the front reinforce 32, the rear roof side reinforce 34, the rear pillar upper reinforce 36, the rear pillar lower reinforce 37 and the sill reinforce 38.

Figure 3:
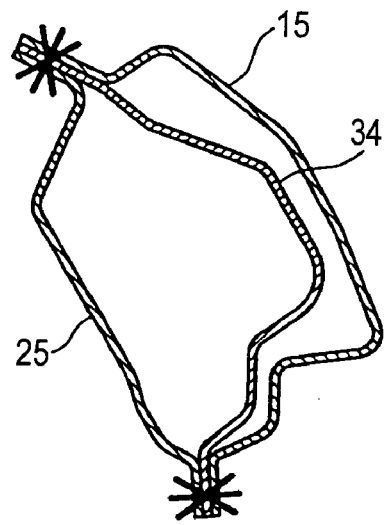
FIG. 3 is a sectional view of the upper edge of an opening of a rear door taken along line B—B of FIG. 2.

Referring to FIG. 3, a sectional view of the upper edge of the opening 42 of the rear door taken along line B—B of FIG. 2 is shown and as shown in the same view, for example, in the upper edge of the opening 42 of the rear door, a closed sectional structure formed from the roof side outer part 15 and the roof side inner part 25 is divided into two portions by the rear roof side reinforce 34 and two closed sectional structures are formed and thus, rigidity in the upper edge of the opening 42 of the rear door is improved.

Figure 4:
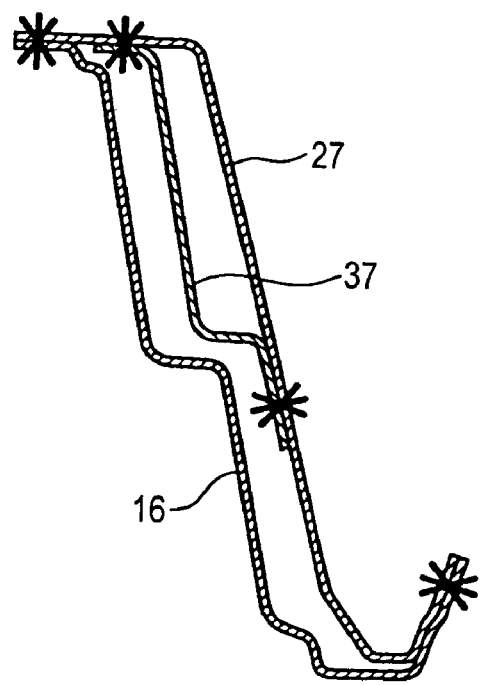
FIG. 4 is a sectional view of a rear edge lower portion of the opening of the rear door taken along line C—C of FIG. 2.

Also, referring to FIG. 4, a sectional view of a rear edge lower portion of the opening 42 of the rear door taken along line C—C of FIG. 2 is shown and as shown in the same view, for example, in the rear edge lower portion of the opening 42 of the rear door, a closed sectional structure formed from the rear pillar inner lower 27 and the rear pillar lower reinforce 37 is further formed in the inside of a closed sectional structure formed from the front of the rear fender part 16 and the rear pillar inner lower 27 and thus, rigidity in the rear edge lower portion of the opening 42 of the rear door is improved.

In this manner, in the side body structure according to the first embodiment of the invention, vehicle body rigidity of the periphery of the opening 42 of the rear door as well as the periphery of the opening 40 of the front door is enhanced.

Therefore, according to the side body structure, for example, even in case that a vehicle collides, the opening 42 of the rear door as well as the opening 40 of the front door can be maintained surely in a state of the openings whose peripheral edges have small deformation, and trouble in which the front door and the rear door cannot be opened and closed can be prevented well.

Incidentally, it has been constructed herein so that the front reinforce 32, the rear roof side reinforce 34, the rear pillar upper reinforce 36, the rear pillar lower reinforce 37 and the sill reinforce 38 are separately molded and joined, but it is not limited to this and it may be constructed so as to integrally mold these parts by press.

Figure 5:
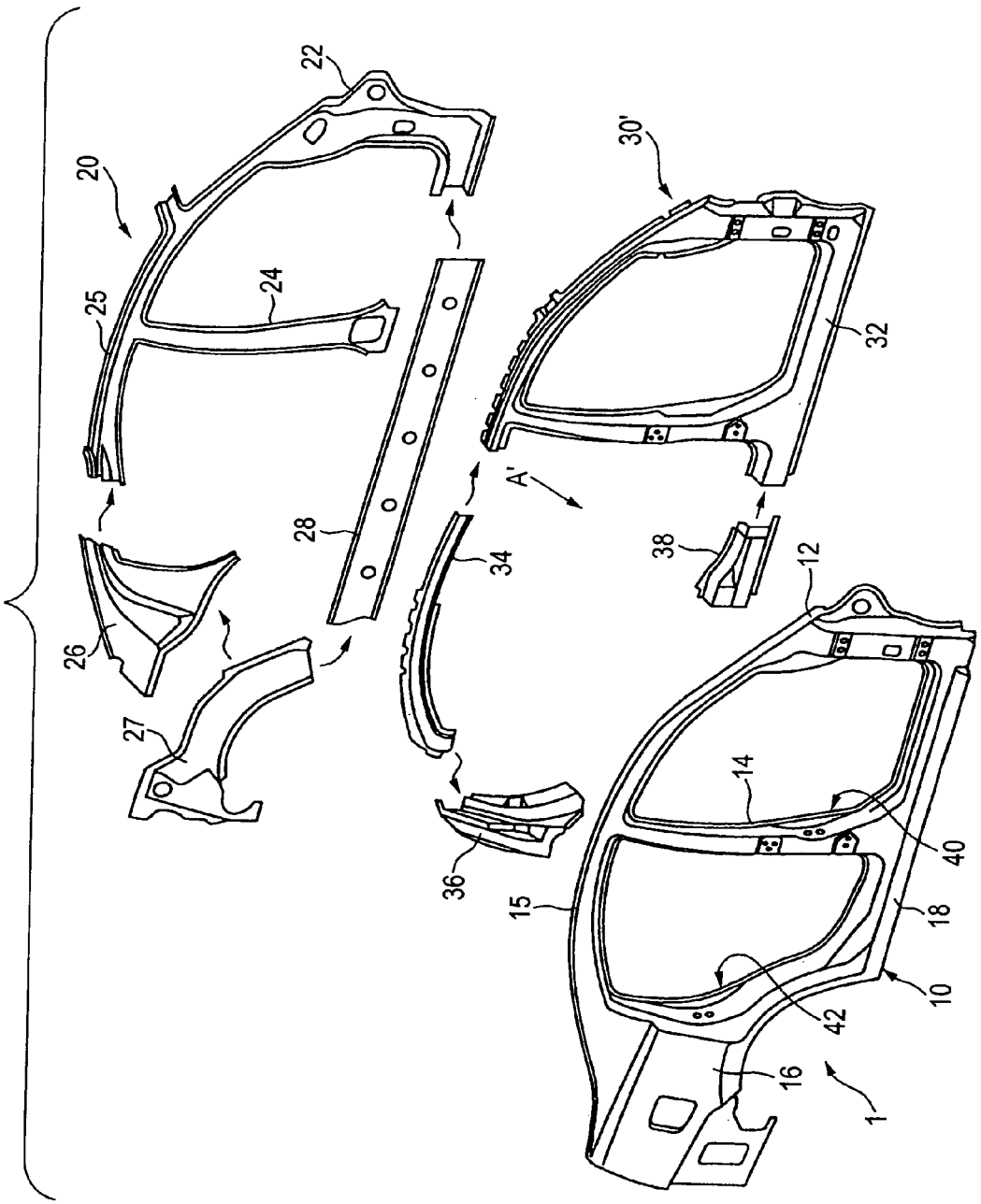
FIG. 5 is an exploded configuration view showing a side body according to a second embodiment of the invention.

Next, a second embodiment will be described. Referring to FIG. 5, a right portion of a pair of right and left side bodies 1', 1' according to the second embodiment is shown in an exploded configuration view in a manner similar to that of FIG. 1 and referring to FIG. 6, a view viewed from a direction of an arrow A' of FIG. 5 is shown in a manner similar to that of FIG. 2, and a side body structure according to the second embodiment of the invention will be described below based on these views. Incidentally, description is omitted by attaching the same numerals to the same parts and regions as those of the first embodiment.

The second embodiment differs from the first embodiment in that there is not the rear pillar lower reinforce 37, and only the respect different from the first embodiment will be described below.

As shown in FIG. 5, in the second embodiment, a side body reinforce 30' is formed by joining a front reinforce 32 molded along the peripheral edge of an opening 40 of a front door, a rear roof side reinforce 34, a rear pillar upper reinforce (rear pillar reinforce) 36 and a sill reinforce 38 along a shape of a side body outer 10 or a shape of a side body inner 20 as shown by arrows.

Figure 6:
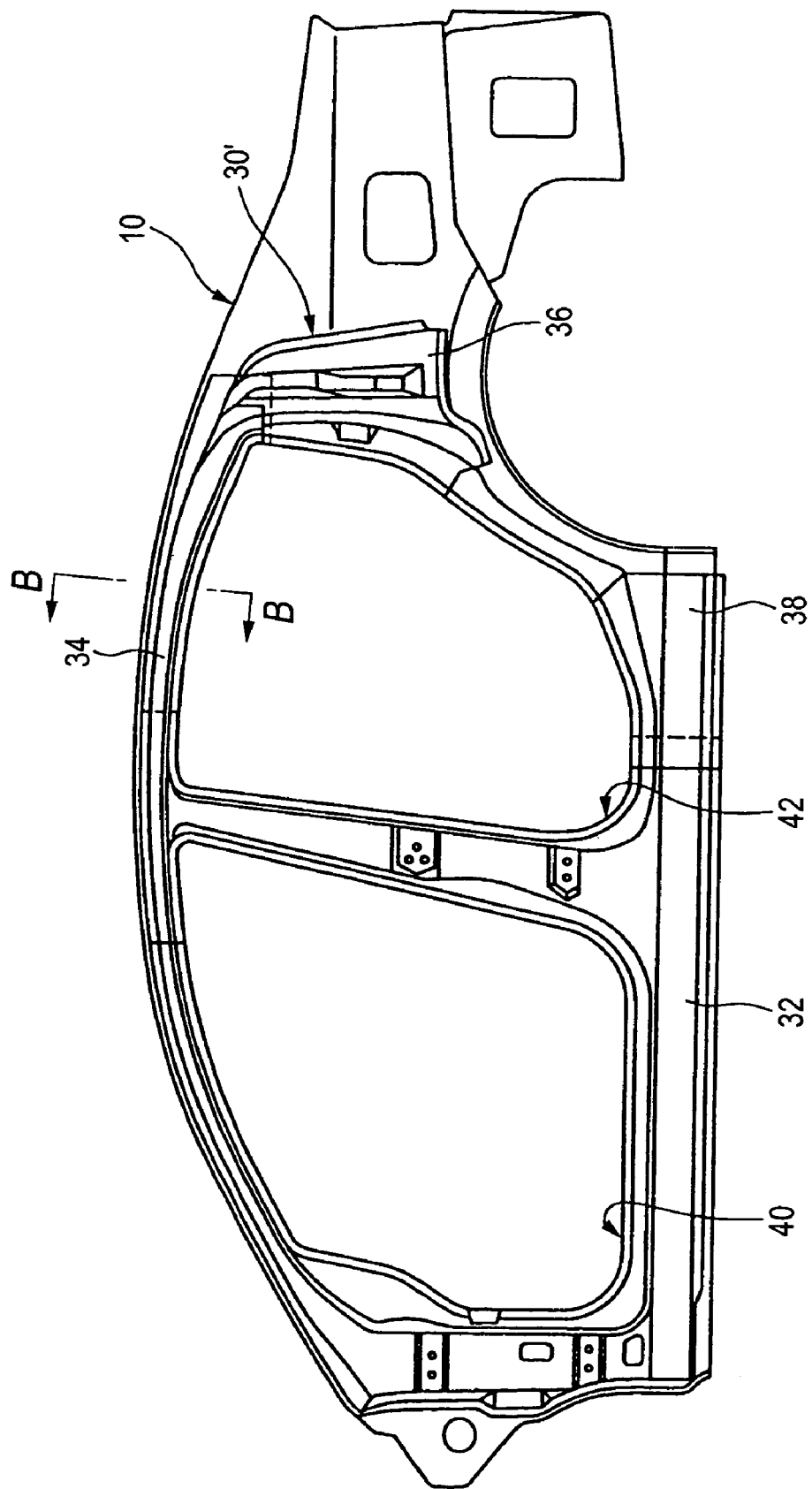
FIG. 6 is a view viewed from a direction of an arrow A' of FIG. 5 and is a view of a state in which only a side body reinforce according to the second embodiment of the invention is set in a side body outer.

That is, as shown in FIG. 6, in the second embodiment, it is configured so that the front reinforce 32 is coupled to the rear pillar upper reinforce 36 through the rear roof side reinforce 34 but the rear pillar upper reinforce 36 is separated from the sill reinforce 38 and a reinforce is not present between the front of a rear fender part 16 and a rear pillar inner lower 27.

However, even when the reinforce is not present between the front of the rear fender part 16 and the rear pillar inner lower 27 thus, at least the front reinforce 32 is coupled to the rear pillar upper reinforce 36 through the rear roof side reinforce 34 and thereby the effect similar to that described above can be obtained. The front reinforce 32, the rear pillar upper reinforce 36 and the rear roof side reinforce 34 form a closed sectional structure at least together with the side body inner panel.

Specifically, the upper edge of an opening 42 of a rear door is a portion connected to a roof panel (not shown) and the roof panel is a flat plate, so that rigidity is low originally, but the rear roof side reinforce 34 for coupling the front reinforce 32 to the rear pillar upper reinforce 36 is provided in at least the upper edge of the opening 42 of the rear door together with the front reinforce 32 and thereby, vehicle body rigidity of a rear edge upper portion and the upper edge of the opening 42 of the rear door which tends to be bent and deformed as well as vehicle body rigidity of the periphery of the opening 40 of the front door can be improved intensively while the number of parts is reduced to a necessary minimum and cost reduction and weight reduction of a vehicle body are achieved.

Therefore, in accordance with the side body structure according to the second embodiment of the invention, for example, even in case that a vehicle collides, the opening 42 of the rear door as well as the opening 40 of the front door can be maintained sufficiently in a state of the openings whose peripheral edges have small deformation, and trouble in which the front door and the rear door cannot be opened and closed can also be prevented well in a manner similar to the case of the first embodiment.

What is claimed is:

1. A side body structure of a vehicle having a front door and a rear door, comprising:
   a side body outer panel which forms an outer member of the vehicle and independently defines an opening of the front door and an opening of the rear door with a center pillar part sandwiched between the openings;
   a side body inner panel which is provided along the side body outer panel in the inside of the vehicle of the side body outer panel and forms a closed sectional structure together with the side body outer panel; and
   a side body reinforce provided in a shape of the number "8" along the peripheral edge of the opening of the front door and the peripheral edge of the opening of the rear door between the side body outer panel and the side body inner panel.

2. A side body structure as claimed in claim 1, wherein the side body reinforce forms a closed sectional structure at least together with the side body inner panel.

3. A side body structure as claimed in claim 1, wherein the side body reinforce comprises:
   a front reinforce formed in the periphery of the opening of the front door and having a perimeter shape; and
   a rear reinforce that defines the opening of the rear door together with the front reinforce.

4. A side body structure as claimed in claim 3, wherein the rear reinforce is formed in a shape substantially of the letter "U" toward the front of the vehicle.

5. A side body structure as claimed in claim 4, wherein the rear reinforce has a rear pillar upper reinforce provided along a rear edge upper portion of the opening of the rear door between the side body outer panel and the side body inner panel, a rear roof side reinforce provided so as to couple the front reinforce to the rear pillar upper reinforce along the upper edge of the opening of the rear door between the side body outer panel and the side body inner panel, a sill reinforce which is coupled to the front reinforce and is disposed in a state opposed to a side sill part of the side body outer panel, and a rear pillar lower reinforce which is formed along a rear wheel house and couples the rear pillar reinforce to the sill reinforce.

6. A side body structure of a vehicle having a front door and a rear door, comprising:
   a side body outer panel which forms an outer member of the vehicle and independently defines an opening of the front door and an opening of the rear door with a center pillar part sandwiched between the openings;
   a side body inner panel which is provided along the side body outer panel in the inside of the vehicle of the side body outer panel and forms a closed sectional structure together with the side body outer panel;
   a front reinforce which is provided along the peripheral edge of the opening of the front door between the side body outer panel and the side body inner panel and forms a closed sectional structure at least together with the side body inner panel;
   a rear pillar reinforce which is provided along a rear edge upper portion of the opening of the rear door between the side body outer panel and the side body inner panel and forms a closed sectional structure at least together with the side body inner panel; and
   a rear roof side reinforce which is provided so as to couple the front reinforce to the rear pillar reinforce along the upper edge of the opening of the rear door between the side body outer panel and the side body inner panel and forms a closed sectional structure at least together with the side body inner panel.

* * * * *